(12) United States Patent
Hohndel et al.

(10) Patent No.: US 9,483,308 B2
(45) Date of Patent: Nov. 1, 2016

(54) PERFORMANCE OF PREDICTED ACTIONS

(75) Inventors: Dirk Hohndel, Portland, OR (US);
Adriaan Van De Ven, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 215 days.

(21) Appl. No.: 13/539,177

(22) Filed: Jun. 29, 2012

(65) Prior Publication Data

US 2014/0006623 A1    Jan. 2, 2014

(51) Int. Cl.
| G06F 15/173 | (2006.01) |
| G06F 9/50 | (2006.01) |
| G06F 11/30 | (2006.01) |
| G06F 11/34 | (2006.01) |

(52) U.S. Cl.
CPC ......... *G06F 9/5011* (2013.01); *G06F 11/3452* (2013.01); *G06F 11/3055* (2013.01); *G06F 11/3058* (2013.01); *G06F 11/3409* (2013.01)

(58) Field of Classification Search
CPC ............. H04L 41/147; H04L 12/5695; H04L 29/08171; H04L 29/08144; H04L 29/06; H04L 29/08072; G06F 9/5011; G06F 11/3452; G06F 11/3055; G06F 11/3058; G06F 11/3409
USPC ................................. 709/226, 205, 206, 207
See application file for complete search history.

(56) References Cited

U.S. PATENT DOCUMENTS

| 6,098,064 A | 8/2000 | Pirolli et al. |
| 6,453,389 B1 | 9/2002 | Weinberger et al. |
| 7,487,296 B1 | 2/2009 | Iacobovici et al. |
| 8,606,728 B1 | 12/2013 | Lin et al. |
| 8,645,300 B1 | 2/2014 | Cowdrey et al. |
| 2002/0174217 A1* | 11/2002 | Anderson ............... 709/224 |
| 2004/0054850 A1* | 3/2004 | Fisk ................ H04L 41/08 711/112 |
| 2006/0047804 A1 | 3/2006 | Fredricksen et al. |

(Continued)

FOREIGN PATENT DOCUMENTS

| CN | 101960420 A | 1/2011 |
| JP | 2004008471 | 1/2004 |

(Continued)

OTHER PUBLICATIONS

International Search Report and Written Opinion mailed Aug. 30, 2013 for International Application No. PCT/US2013/042092, 11 pages.

(Continued)

*Primary Examiner* — Kevin Bates
*Assistant Examiner* — Sm Rahman
(74) *Attorney, Agent, or Firm* — Schwabe, Williamson & Wyatt, P.C.

(57) ABSTRACT

Embodiments of techniques and systems for performance of predicted actions are described. In embodiments, a predicted action performance engine ("PAE") may receive one or probabilities of potential actions that may be performed on a computing device. The PAE may also receive a system context for the computing device describing available resources on the computing device, workload, etc. Based on these probabilities and the system context, the PAE may determine one or more predicted actions and/or resource utilizations which are likely to occur and which may be performed ahead of time. The PAE may then facilitate performance of these actions and/or resource utilizations. Other embodiments may be described and claimed.

27 Claims, 11 Drawing Sheets

(56) References Cited

U.S. PATENT DOCUMENTS

| | | |
|---|---|---|
| 2006/0155664 A1 | 7/2006 | Morikawa et al. |
| 2007/0008989 A1 | 1/2007 | Joglekar |
| 2007/0143765 A1* | 6/2007 | Aridor .................. G06F 9/5011 718/104 |
| 2007/0192065 A1* | 8/2007 | Riggs et al. ................... 702/189 |
| 2007/0265811 A1* | 11/2007 | Chalasani et al. ................. 703/2 |
| 2008/0005695 A1 | 1/2008 | Ozzie et al. |
| 2008/0005736 A1 | 1/2008 | Apacible et al. |
| 2008/0201332 A1 | 8/2008 | Souders et al. |
| 2009/0036102 A1 | 2/2009 | Ho |
| 2009/0172168 A1* | 7/2009 | Sonoda ................. G06F 9/5061 709/226 |
| 2009/0216707 A1 | 8/2009 | Keohane et al. |
| 2009/0300173 A1 | 12/2009 | Bakman et al. |
| 2010/0094791 A1 | 4/2010 | Miltonberger |
| 2011/0144819 A1 | 6/2011 | Andrews et al. |
| 2011/0145185 A1 | 6/2011 | Wang et al. |
| 2011/0320518 A1 | 12/2011 | Tsui et al. |
| 2012/0004041 A1 | 1/2012 | Pereira et al. |
| 2012/0011530 A1 | 1/2012 | Bentolila et al. |
| 2012/0110579 A1* | 5/2012 | Bullen .......................... 718/100 |
| 2012/0123993 A1 | 5/2012 | Wang et al. |
| 2013/0007260 A1* | 1/2013 | Jain et al. ..................... 709/224 |
| 2013/0073935 A1 | 3/2013 | Bertot et al. |
| 2013/0173513 A1 | 7/2013 | Chu et al. |
| 2013/0218876 A1 | 8/2013 | Lonnfors et al. |
| 2013/0268393 A1 | 10/2013 | Haze et al. |

FOREIGN PATENT DOCUMENTS

| | | |
|---|---|---|
| JP | 2005332127 | 12/2005 |
| JP | 2010520536 | 6/2010 |
| KR | 1020040004549 | 1/2004 |
| WO | WO02-44901 A2 | 6/2002 |
| WO | WO2004068399 A | 8/2004 |
| WO | WO2009108344 A1 | 9/2009 |
| WO | WO 2013/101567 A1 | 7/2013 |

OTHER PUBLICATIONS

International Search Report and Written Opinion mailed Aug. 30, 2013 for International Application No. PCT/US2013/042094, 11 pages.

International Search Report and Written Opinion mailed Sep. 5, 2013 for International Application No. PCT/US2013/042096, 9 pages.

Office Action mailed Feb. 6, 2014 for U.S. Appl. No. 13/539,143, 22 pages.

Kroeger et al. (The Case for Efficient File Access Pattern Modeling, Jul. 28, 2010; University of California), 6 pages.

Final Office Action mailed Jul. 14, 2014 for U.S. Appl. No. 13/539,143, 21 pages.

Office Action mailed Aug. 1, 2014 for U.S. Appl. No. 13/539,157, 30 pages.

Yan T. et al., "Fast App Launching for Mobile Devices Using Predictive User Context", MobiSys'12, Jun. 25-29, 2012, Low Wood Bay, Lake District, UK, pp. 113-126.

Makkar P. et al., "A Novel Approach for Predicting User Behavior for Improving Web Performance", (IJCSE) International Journal on Computer Science and Engineering, vol. 02, No. 04, 2010, pp. 1233-1236.

Patent Examination Report mailed Jun. 22, 2015 for Australian Patent Application No. 2013281102, 3 pages.

Patent Examination Report mailed Jun. 22, 2015 for Australian Patent Application No. 2013281103, 3 pages.

Patent Examination Report mailed Jun. 19, 2015 for Australian Patent Application No. 2013281104, 3 pages.

Office Action mailed Jul. 1, 2015 for U.S. Appl. No. 13/539,143, 23 pages.

Final Office Action mailed Dec. 17, 2015 for U.S. Appl. No. 13/539,143, 24 pages.

* cited by examiner

PERFORMANCE OF PREDICTED ACTIONS

BACKGROUND

Many users experience slower-than-expected performance when using computing devices. In particular, many new computers and devices are often perceived as only marginally faster than their predecessors because response time of the system to user input may remain similar to older systems. Similarly, common applications may be perceived to take about the same amount of time to start or to complete.

For example, clicking on a button in a user interface or starting a new command often tends to result in a largely constant response time from system to system. This performance may appear to be almost independent from the real performance and capabilities of the underlying system. While use of solid state drives and smarter caching mechanisms may help in some circumstances, they have not solved this issue.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), electronic circuit, a processor (shared, dedicated, or group) and/or memory (shared, dedicated, or group) that execute one or more software or firmware programs, a combinational logic circuit, and/or other suitable components that provide the described functionality.

Figure 1:
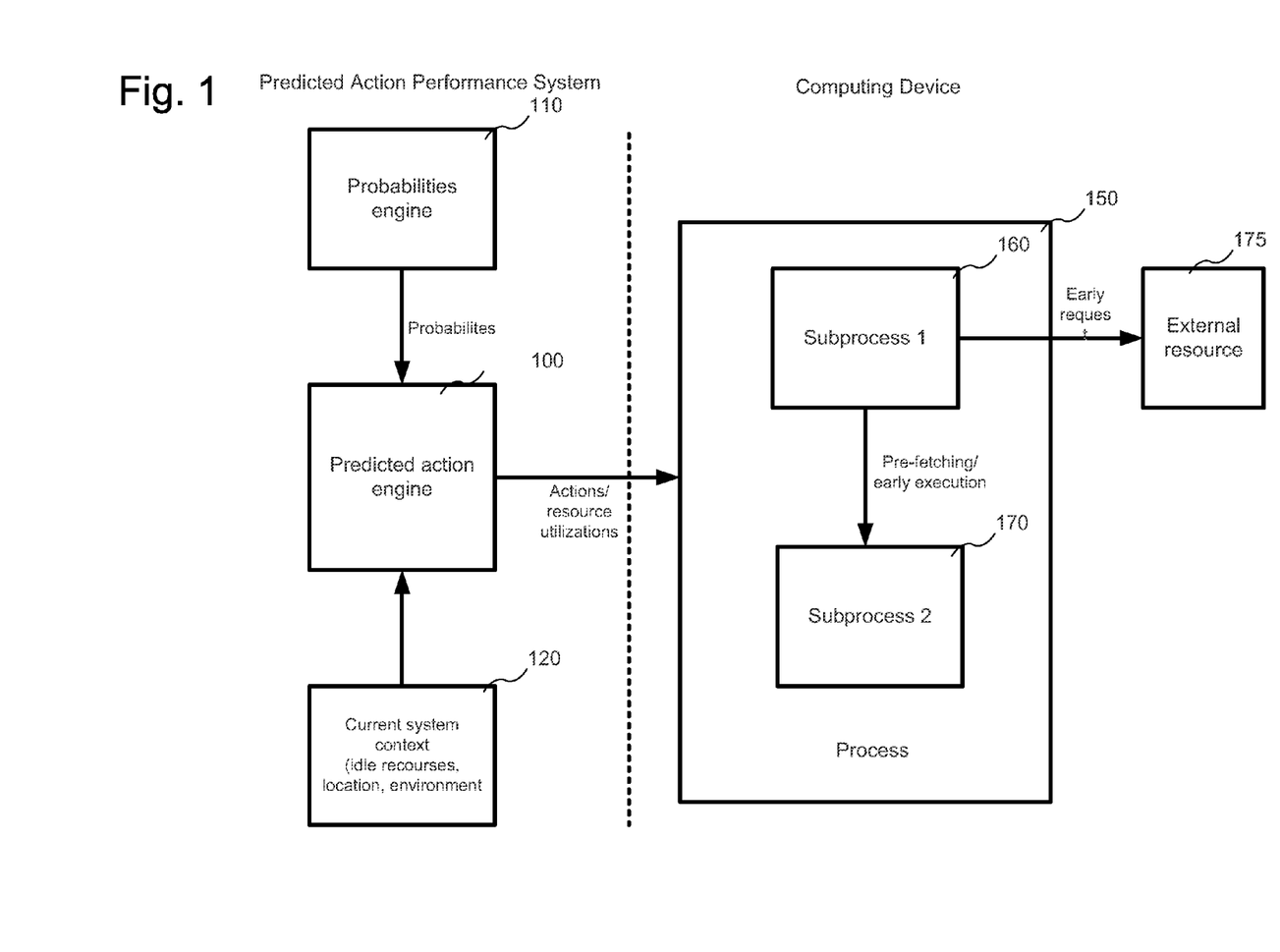
FIG. 1 is a block diagram illustrating an example predicted action performance system, in accordance with various embodiments.

Referring now to FIG. 1, a block diagram is shown illustrating embodiments of an example predicted action performance system. In various embodiments, the predicted action performance system may include a predicted action engine 100 ("PAE 100") and a probabilities engine 110 ("PE 110"). In various embodiments, the PAE 100 may be configured to receive information about the historical and/or current operation of a computing device. The PAE 100 may be configured to, based in part on this information, select one or more actions to support potential actions and/or resource utilizations that are predicted as likely to occur on the computing device. In various embodiments, actions may include such things as starting of processes, opening a window or dialog box, incoming network events, or user interaction. For example, the PAE 100 may be configured to select to pre-load code for an application that is predicted to be executed soon, or may read data into a cache.

As illustrated in the example of FIG. 1, in various embodiments, the PAE 100 may be configured to select actions to support potential actions and/or resource utilizations of an executing process, such as process 150. In various embodiments, the process 150 may include a subprocess 160. In various embodiments, the PAE 100 may be configured to predict that a second subprocess 170 is likely to be executed in the near future. Thus, in various embodiments, the PAE 100 may be configured to facilitate pre-fetching of (and/or facilitate early execution of) code for the subprocess 170. In other embodiments, the PAE may be configured to cause pre-fetching and/or early execution of executable code that is outside of a currently-executing process. For example, if an email is received with an attachment of a particular document type, the PAE 100 may select to pre-fetch code for an application or process that is configured to read that document type.

Similarly, in some embodiments, the PAE 100 may be configured to predict that an external resource 175 (for example a network card) is likely to be used in the near future (for example, to perform a domain name system search). Thus, in various embodiments, the PAE 100 may be configured to facilitate the making of an early request of the external resource 175. Recognizing that the foregoing example was merely indicative of potential actions and capabilities of the PAE 100, in other embodiments, different processes or external resources may be involved.

In the examples of FIG. 1, aspects of the predicted action performance system may be illustrated on the left side of the dashed line, while aspects of the computing device for which the predicted action performance system is predicting action may be illustrated on the right side of the dashed line. Thus, in some embodiments, the predicted action performance system may be configured to operate on a device or apparatus that is separate from the predicted action performance system. However, in various embodiments, one or more aspects of the predicted action performance system may be operated on the same computing device that actions are being predicted for.

In various embodiments, the PAE 100 may be configured to receive one or more probabilities of potential actions to be performed on a computing device. In various embodiments, the PAE 100 may receive these probabilities from the PE 110. Particular embodiments of the PE 110 are discussed below.

In various embodiments, the PAE 100 may also be configured to receive (or otherwise obtain) a current system context 120 for the computing device. In various embodiment, the system context may include a state of the computing device (e.g., power, performance, memory, storage, load, battery state, and/or thermal data), logical environment (e.g., network connectivity, data received over a network), and/or physical location of the computing device e.g., is the computing device mobile, at home, at an office, on a flight, in a foreign country, etc.). In various embodiments, the context may include other information, both outside and inside the computing device, data, and/or conclusions that may be drawn from that information and data.

In various embodiments, the current system context may be received passively by the PAE 100, such as by applications or system processes reporting system context information to the PAE 100. In other embodiments, the PAE 100 may configured to actively request and/or otherwise obtain the current system context 120 from the computing device. In various embodiments, the PAE 100 may be configured to select actions for performance based on available system resources, such as those identified in the current system context.

Figure 2:
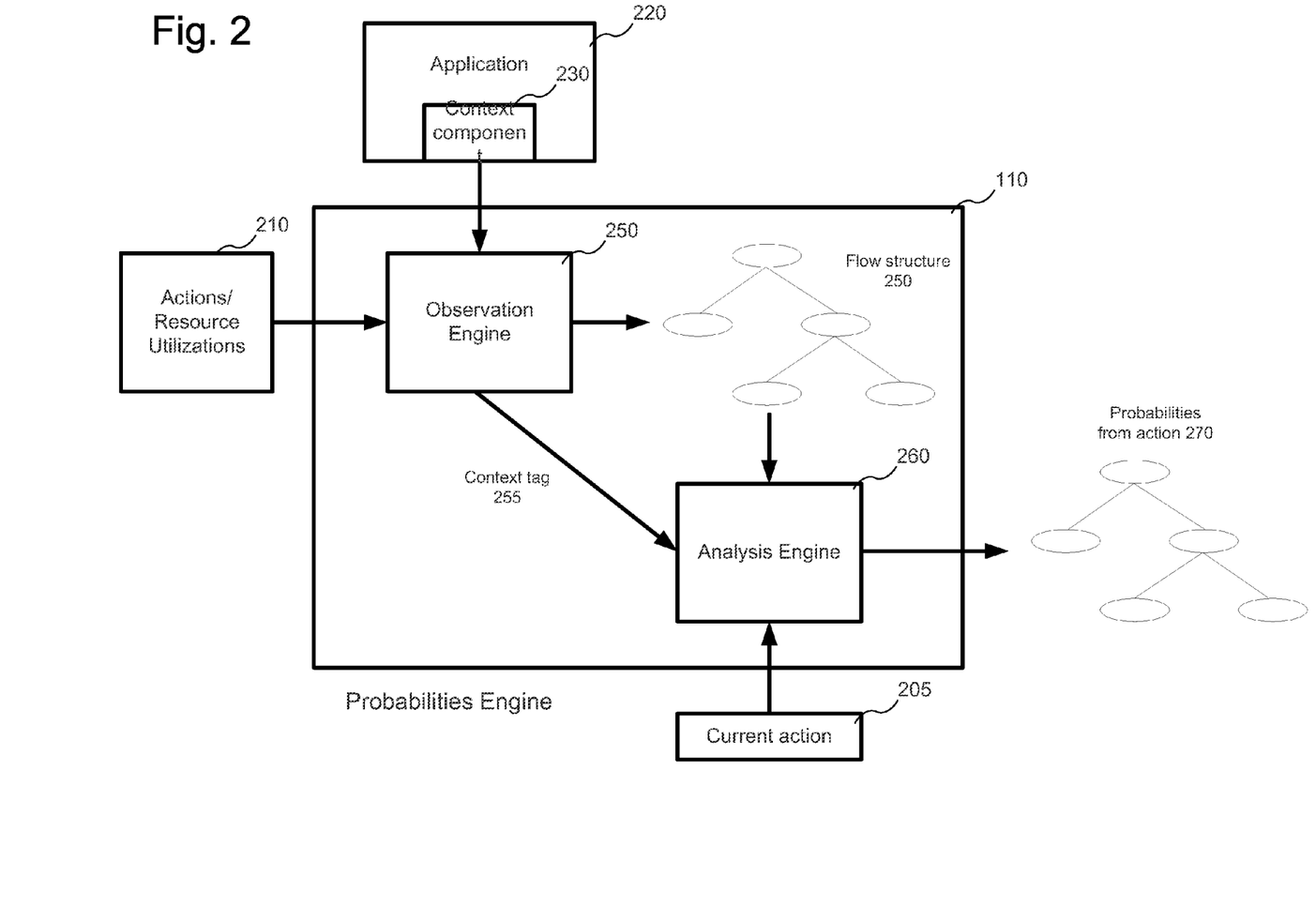
FIG. 2 is a block diagram illustrating an example probabilities engine, in accordance with various embodiments.

Referring now to FIG. 2, a block diagram is shown illustrating an example PE 110, in accordance with various embodiments. In various embodiments, the PE 110 may include an observation engine 250 ("OE 250") and an analysis engine 260 ("AE 260"). In various embodiments, the OE 250 may be configured to receive actions and resource utilizations 210 of the computing device. As described herein the OE 250 may generate a flow structure 250 describing steady states and transitions of the computing device based on the historical data received by the OE 250. This flow structure may be used by the AE 260, along with an indication of a current action 205 that is being performed by the computing device, to determine one or more probabilities for potential actions that may follow the received current action 205. These probabilities may be used by the PAE 100 to select an action for performance, as described herein.

In various embodiments, the actions/resource utilizations 210 may be received passively by the OE 250, such as by applications or system processes reporting indications of actions and/or resource utilizations that have been performed to the OE 250. In other embodiments, the OE 250 may configured to actively request and/or otherwise obtain the actions and/or resource utilizations 210 from the computing device.

In various embodiments, the OE 250 may also be configured to receive application context information from one or more applications 220 executing on the computing device. In various embodiments, the application 220 may include a context component 230 which may be in communication with the OE 250 in order to provide the context information. The application 220 may be so configured in order to provide the OE 250, and therefore the PE 110, with more information than would otherwise be available to the PE 110 without direct assistance from applications executing on the computing device. For example, a coding environment application 220 may provide, such as through its context component 230, tags that describe a type of code is being written in the application. In another example, an email application 220 may provide a tag that an email has been received, a tag of the sender of the email, and a tag describing that a .ppt file is attached. This information may be used by the PE 110 to determine that every time an email with a .ppt file is received from a certain person, PowerPoint is likely to be executed. The PAE 100 may thus facilitate the loading of code for the PowerPoint™ application.

In various embodiments, the context component 230 may provide information such as, but not limited to, application state, information describing one or more files accessed by the application 220, messages received by the application 220, the identity of one or more recipients or senders of information to the application, etc. In various embodiments the context component 230 may provide application context information to the OE 250 in the form of one or more tags. As described below, these tags may be appended to actions and/or resource utilizations 210 received by the OE 250 in order to provide additional context for these received actions and/or resource utilizations 210; this, in turn, may allow the OE to generate more accurate and/or detailed flow structures 250. Similarly, the OE 250 may, in various embodiments, provide one or more context tags 225 to the AE 260, which may be used to provide context to one or more current actions 205. This provision of the context tag 255 may, in various embodiments, facilitate the AE 260 in producing more accurate probabilities 270. Particular uses of application context information and tags are described herein.

Figure 3:
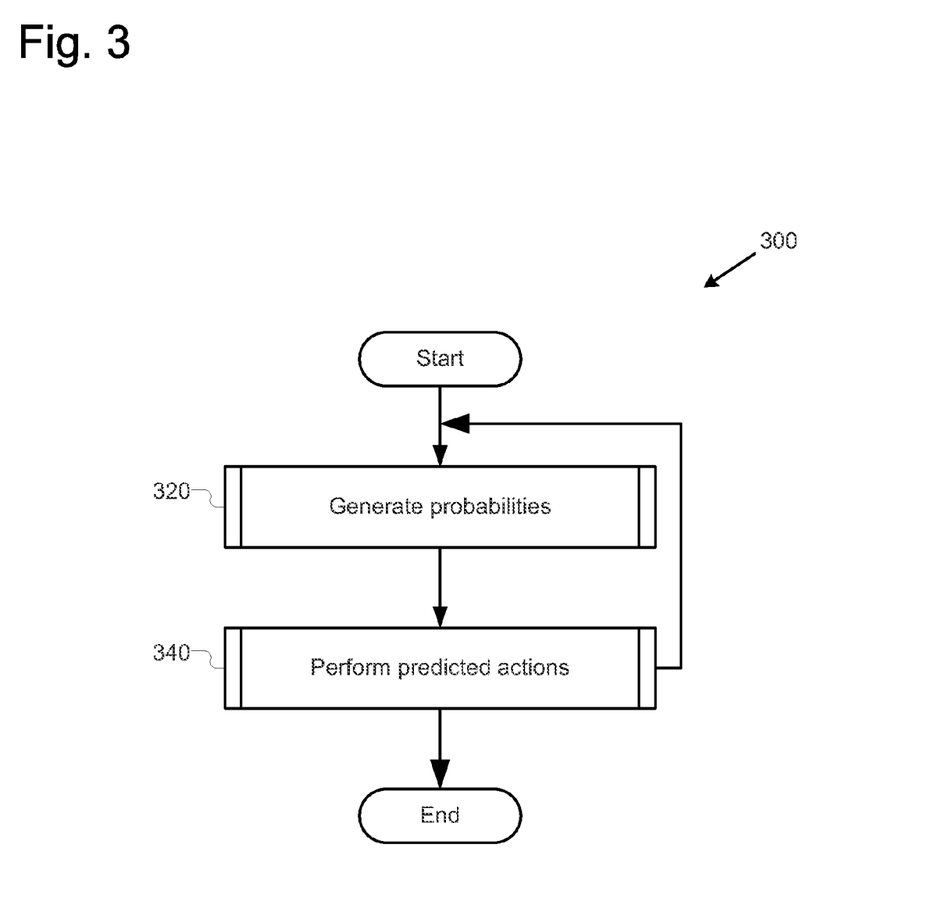
FIG. 3 illustrates an example action prediction and performance process, in accordance with various embodiments.

FIG. 3 illustrates an example action prediction and performance process 300, in accordance with various embodiments. The process may begin at operation 320, where, in various embodiments, the PE 110 may generate one or more probabilities for use by the PAE 100. Particular embodiments of operation 320 are discussed below. Next, at operation 340, the PAE 100 may perform one or more predicted actions based on the probabilities generated by the PE 110 at operation 320. In embodiments, the performance of predicted actions at operation 340 may also be based in part on the current system context 120. Particular embodiments of operation 340 are discussed below. In various embodiments, the process may then repeat at operation 320 for additional probabilities and predicted action. In some embodiments, the process instead end.

Figure 4:
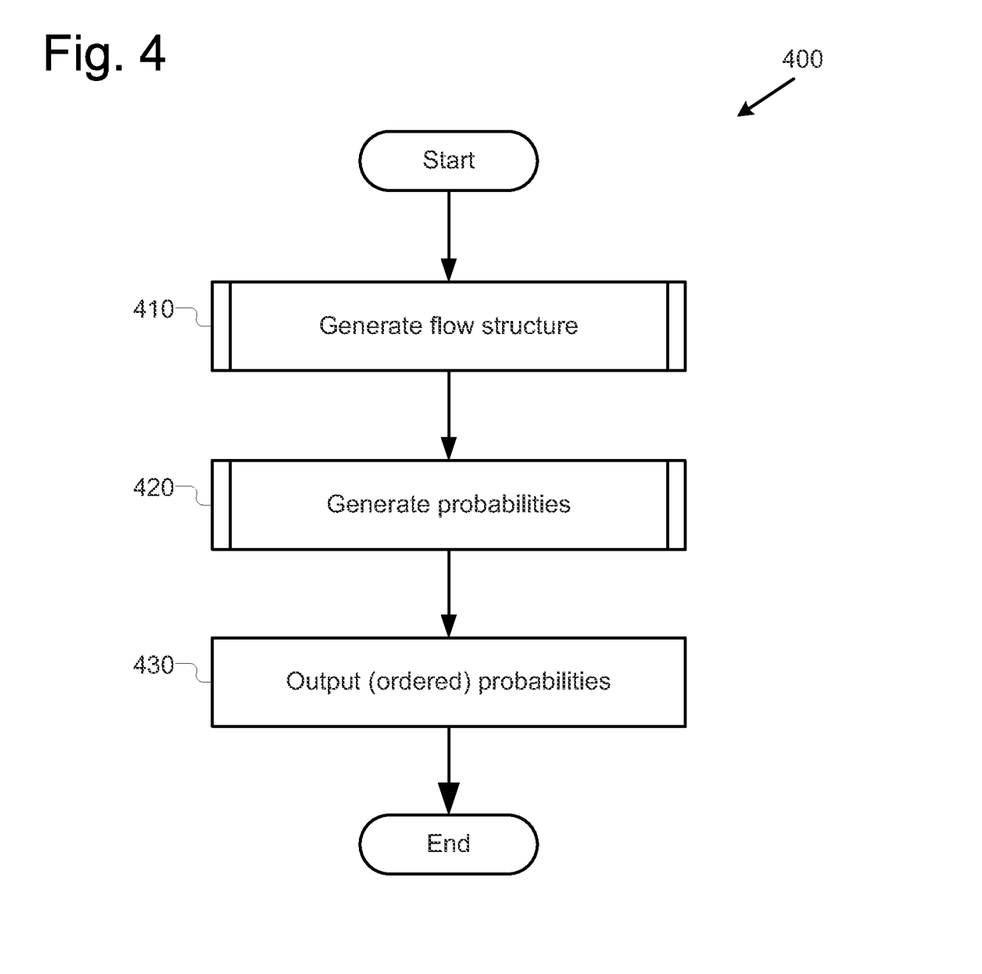
FIG. 4 illustrates an example probability generation process, in accordance with various embodiments.

FIG. 4 illustrates an example probability generation process 400, in accordance with various embodiments. In various embodiments, process 400 may be performed by the PE 110 to implement one or more embodiments of operation 320 of process 300. The process may begin at operation 410, where the OE 250 may generate a flow structure 250. Particular embodiments of operation 410 are discussed below. Next, at operation 420, the AE 260 may generate probabilities based on the generated flow structure 250 and a current action 205. Particular embodiments of operation 420 are discussed below.

Next, at operation 430, the probabilities may be output from the AE 260. In various embodiments, the output probabilities may be ordered for ease of use by the PAE 100. Thus, in some embodiments, the probabilities may be ordered by likelihood. In other embodiments, the probabilities output by the AE 260 may be ordered by assumed distance in time from the current action 205. The process may then end.

Figure 5:
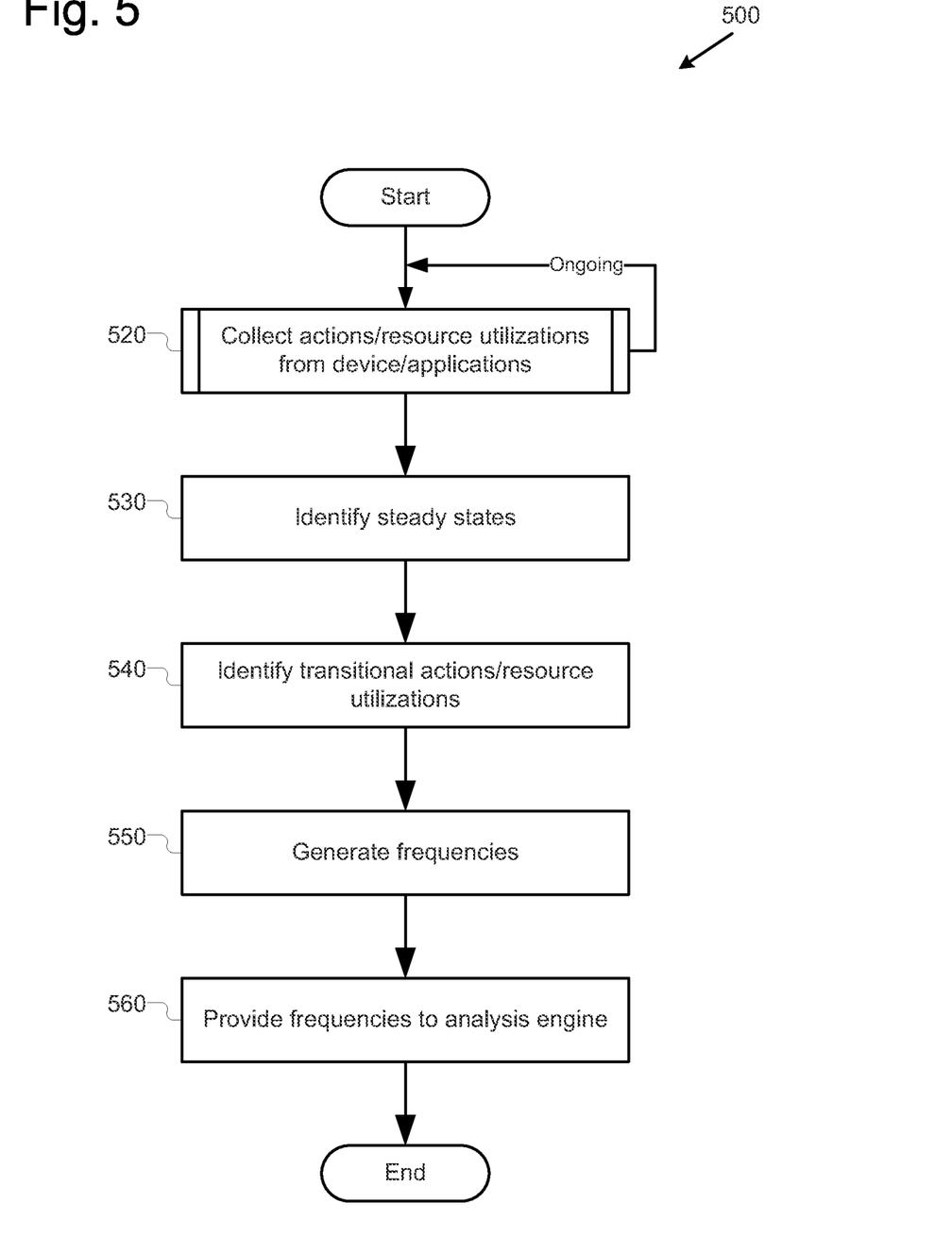
FIG. 5 illustrates an example flow structure generation process, in accordance with various embodiments.

FIG. 5 illustrates an example flow structure generation process 500, in accordance with various embodiments. In various embodiments, process 500 may be performed by the OE 250 to implement one or more embodiments of operation 410 of process 400. The process may begin at operation 520, where the OE 250 may collect information about actions and/or resource utilizations from the computing device. In various embodiments, these observations may be also be acquired from one or more applications. Particular embodiments of operation 520 are described below with reference to process 600 of FIG. 6.

Figure 6:
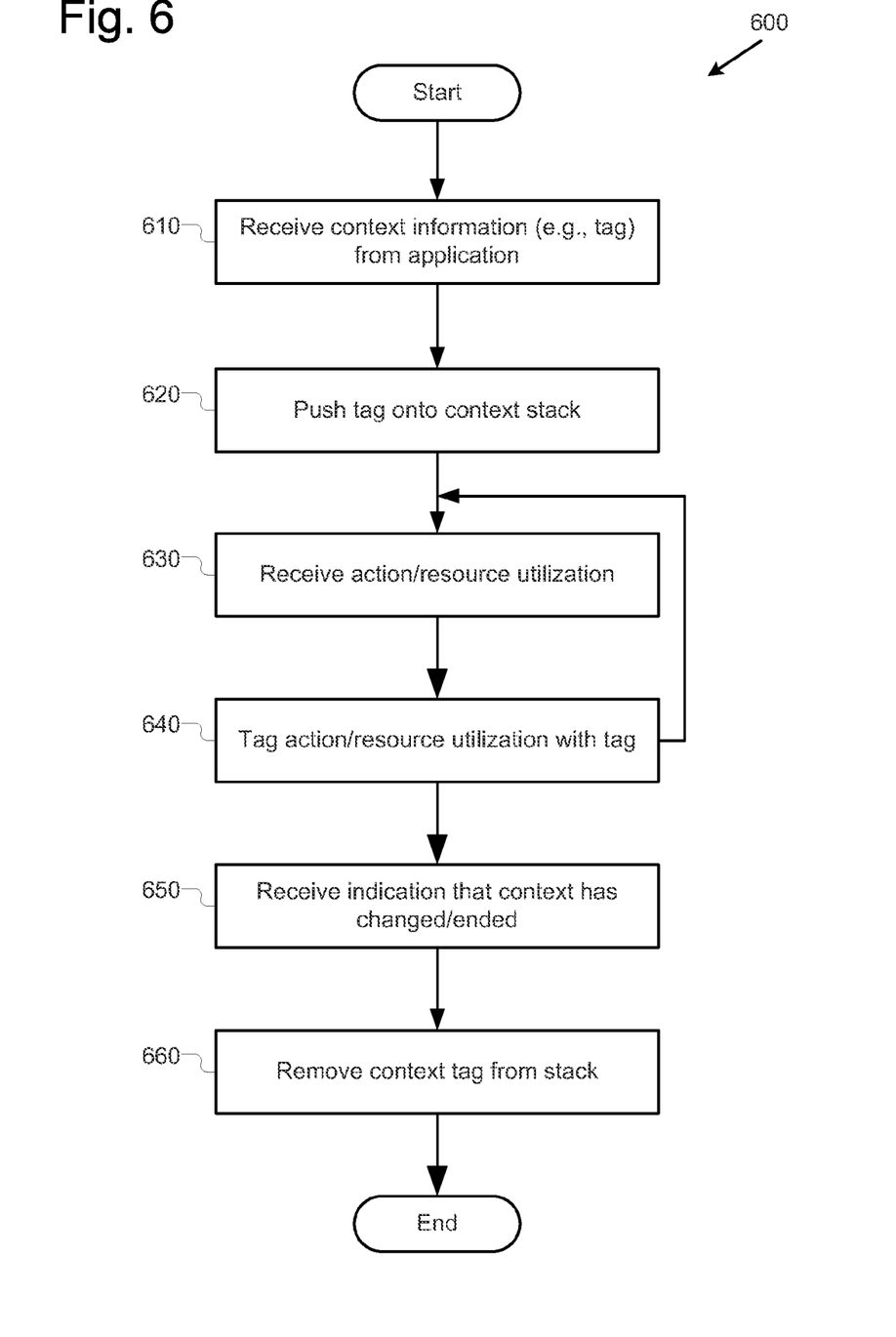
FIG. 6 illustrates an example observation collection process, in accordance with various embodiments.

Referring now to FIG. 6, that figure illustrates an example observation collection process 600, in accordance with various embodiments. In various embodiments, process 600 may be performed by the OE 250 to implement one or more embodiments of operation 510 of process 500. The process may begin at operation 610, where the OE 250 may receive application context information from an application 220. In various embodiments, the application context information may be received from a context component 230 of the application 220. In some embodiments, the application context information may be received in the form of a tag. The following descriptions of operations of process 600 thus may make specific reference to a tag; however it may be recognized that, in other embodiments, the received application context information may take other forms.

At operation 620, the OE 250 may push the recently-received tag onto a stack data structure. In various embodiments, a stack is used in order to allow for easy removal of the context, as well as to allow for nesting of various stacks as they are applied to received actions and resource utilizations; in other embodiments, other data structures may be used to store stacks.

Next, at operation 630, the OE 250 may obtain one or more actions and/or resource utilizations. As discussed above, in various embodiments, these actions and/or resource utilizations may be received passively, while in others, the OE 250 may actively seek out action and/or resource utilization information. Next, at operation 640, the OE 250 may tag the received action/resource utilization with the recently-received tag. This tagging may, in various embodiments, facilitate the OE 250 in providing application context information to accompany received actions and/or resource utilizations, providing improved probability generation. In various embodiments, the OE 250 may repeat operations 630 and 640 in order to receive (and tag) additional actions and/or resource utilizations.

However, the OE 250 may also receive an indication that an application context associated with the application context information has changed, such as at operation 650. Thus, for example, an application 220 may receive a user interaction where a user may select a menu. The application 220 may, such as using its context component 230, then send a tag indicating this menu selection to the OE 250. Later, if the user ends selection of the menu, the context component 230 of the application 220 may indicate to the OE 250 that the relevant context has ended. Then, at operation 660, the OF, 250 may remove the tag from the stack structure. This may effectively end the tagging of future received actions with the received tag. The process may then end.

Returning to process 500 of FIG. 5, after collecting information about actions and/or resource utilizations, process 500 may continue to operation 530, where the OE 250 may identify one or more steady states of the computing device. In various embodiments, as illustrated below, these steady states may represent states at which the computing device is in a consistent state at a particular time. A steady, state may, in various embodiments, include a consistent state of the context of the computing device. In some embodiments, a steady state may include a consistent state of one or more internal variables of the computing device, such as, for example, a current working directory, a current IP address of a network device, a current running state of one or more applications, etc. For example, in one embodiment, an example steady state may be described at a high level as "email program is running in foreground, displaying an editor window, waiting for user input."

Next, at operation 540, the OE 250 may identify one or more transitional actions and/or resource utilizations that may be performed by the computing device. For example, at operation 540, the OE 250 may identify that a directory change command causes the computing device to change between directory steady states. In another example, at operation 540, the OE 250 may identify that a command to execute an application may cause the computing device to change to a steady state where the application is executing. In another example, a transitional actions may include receipt of a command from a user (such as a "send" command in an email application).

Next, at operation 550, the OE 250 may generate frequencies of each of the steady states based on its received information about actions and resource utilizations. Particular examples of these frequencies may be seen below at FIG. 7. At operation 560, these frequencies may be provided to the AE 260 for use in determining probabilities to be used by the PAE 100. The process may then end.

Figure 7:
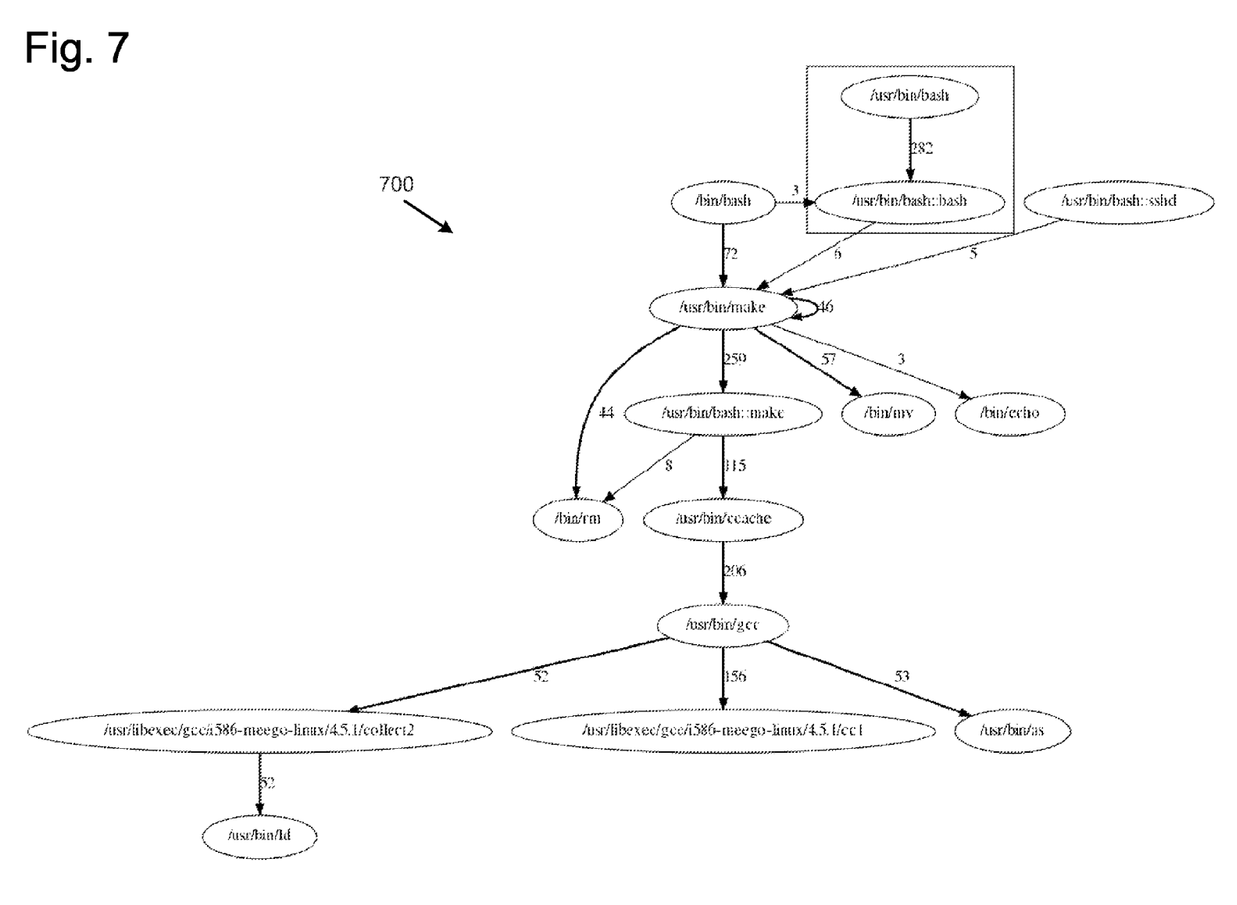
FIG. 7 illustrates an example flow structure, in accordance with various embodiments.

FIG. 7 illustrates an example flow structure with steady states and frequencies, in accordance with various embodiments. In the illustrated example, steady states are illustrated as graph nodes, while the graph transitions show frequencies of how often the OE 260 observed that particular transition between the two steady states during a given period of observation. As the illustrated flow structure 700 shows, steady states may, in various embodiments, include receipt of a command to execute an application (e.g., "/usr/bin/bash", "/usr/bin/make/", "/bin/rm") or may include execution of a process based on that command (e.g., "/usr/bin/bash::bash", "/usr/bin/make::make"). It may be noted that, while the example flow structure of FIG. 7 does not show steady states tagged with application context information, in various embodiments, the flow structure may additionally include application context information. Thus, in various embodiments, more than one steady state may exist for a given directory or process, but with different tags.

Figure 8:
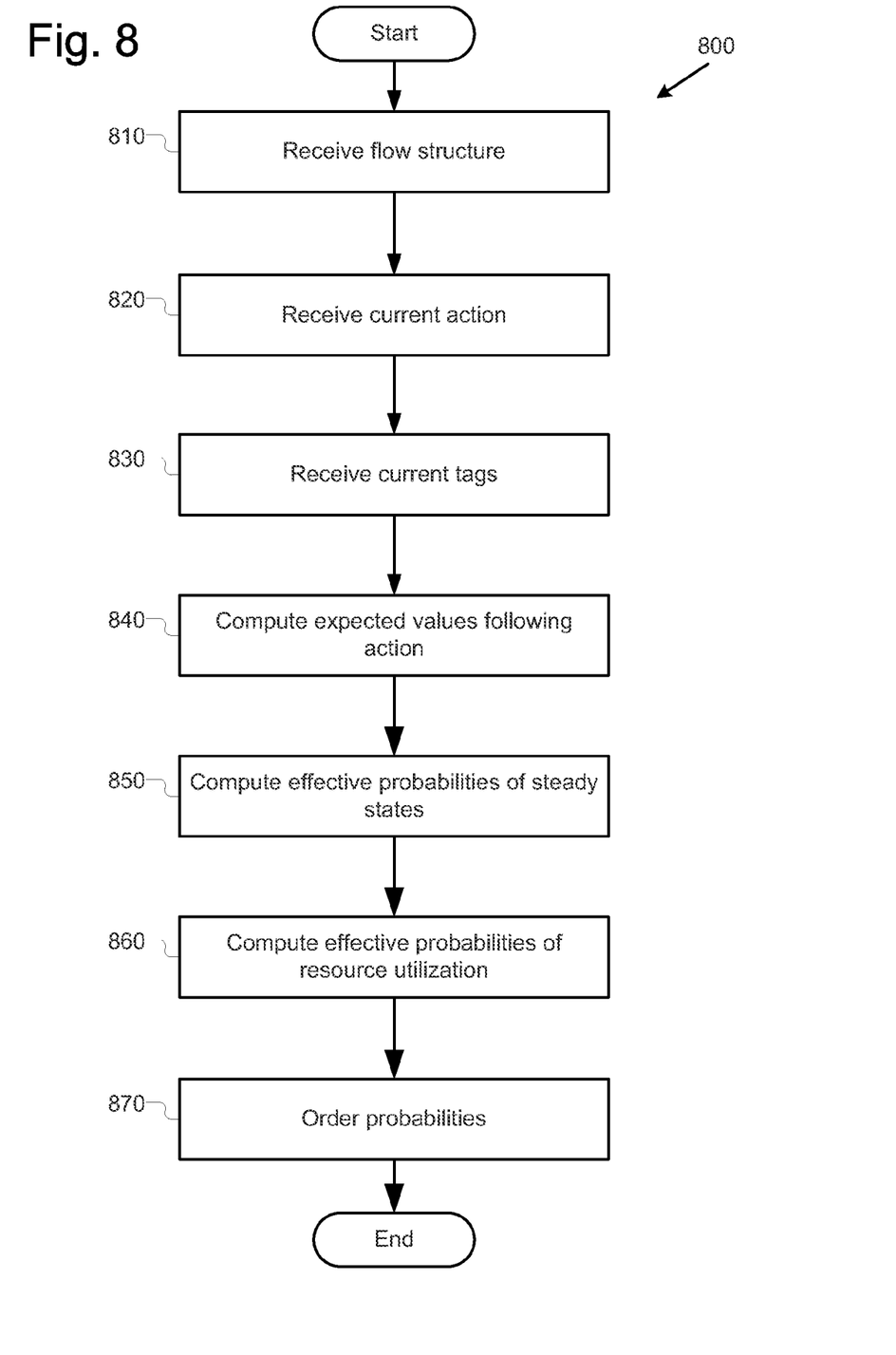
FIG. 8 illustrates an example process for generating probabilities from a flow structure, in accordance with various embodiments.

FIG. 8 illustrates an example process 800 for generating probabilities from a flow structure, in accordance with various embodiments. In various embodiments, process 800 may be performed by the AE 260 to implement operation 420 of process 400. The process may begin at operation 810, where the AE 260 may receive the flow structure generated by the OE 250. Next, at operation 820, the AE 260 may receive an indication of a current action 205. At operation 830, the AF 260 may receive application context tags 255 from the OE 250; these tags may be used to better identify relevant steady states and transitions in the flow structure.

Next, at operation 840, the AE 260 may compute expected values that follow the received action. In various embodiments, the expected values may be computed based on direct frequencies between each steady state to the next and may not include frequencies that are not related the transition for which the expected value is being computed. In various embodiments, the AE 260 may utilize a sub-structure of the received flow structure that only includes steady states that may be reached after performance of the current action 205. In various embodiments, the AE 260 may then compute the expected values for how often each subsequent steady state may be reached after the current action 205.

Figure 9:
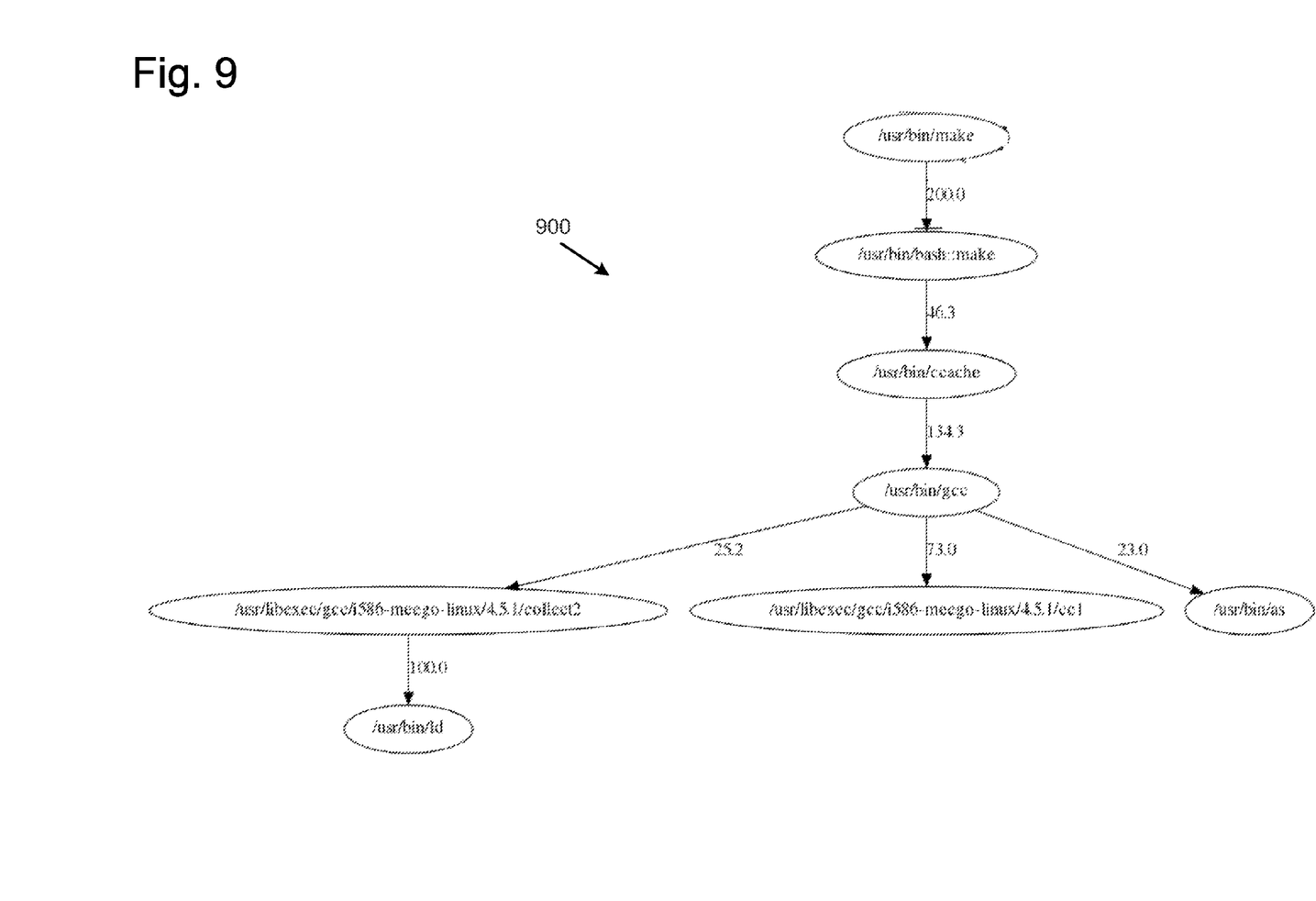
FIG. 9 illustrates an example expected value structure, in accordance with various embodiments.

Referring now to FIG. 9, FIG. 9 illustrates an example expected value structure 900, in accordance with various embodiments. As illustrated in the example of FIG. 9, in various embodiments, the AE 260 may compute expected values in a form of a number of times the transition may be performed out of 100. For example, if based on a current action a given application is expected to be run 50% of the time, the expected value of a transition to that application may be 50 (out of 100). In another example, if an application is expected to be run, on average, twice, the expected value may be 200 out of 100. In some embodiments, the expected value may be capped at a maximum value.

Returning to FIG. 8, at operations 850 and 860, the AE 260 may compute, from the computed expected values, effective probabilities of steady states (850) and of resource utilizations (860). In various embodiments, the AE 260 may compute the effective probabilities by directly multiplying the expected values in probabilistic form. In other embodiments the AE 260 may utilize other methods of computing the probabilities, such as using artificial intelligence-based techniques or by including other information. Finally, at operation 870, the AE 260 may order the computed probabilities, such as by likelihood or distance (e.g. distance in the flow structure) from the current action 205. The process may then end.

Figure 10:
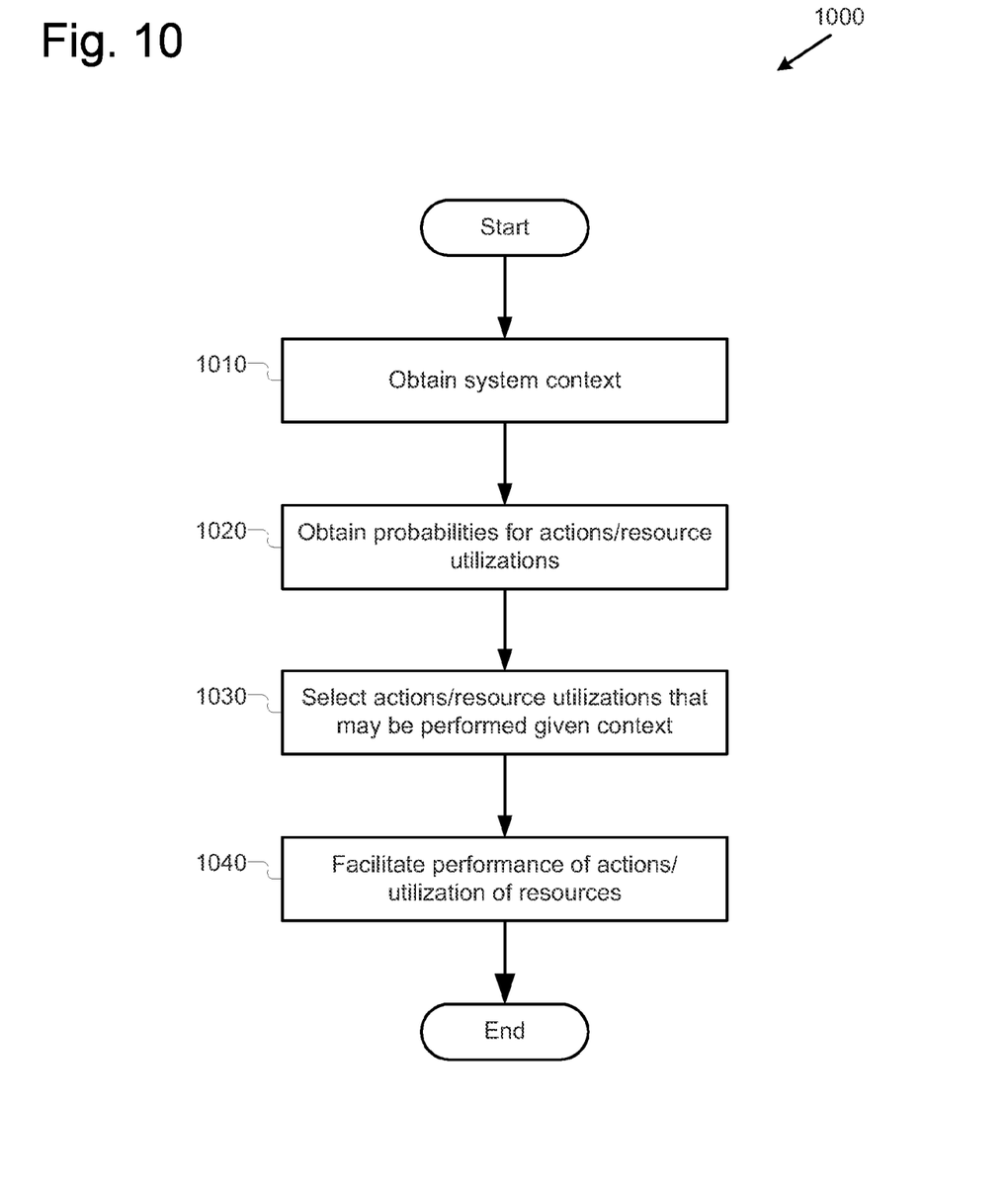
FIG. 10 illustrates an example predicted action performance process, in accordance with various embodiments.

FIG. 10 illustrates an example predicted action performance process 1000, in accordance with various embodiments. In various embodiments, the PAE 100 may perform process 1000 to implement operation 340 of process 300 of FIG. 3. The process may begin at operation 1010, where the PAE 100 may obtain a system context from the computing device. As discussed above, in various embodiments, the system context may include, in various embodiments, resource availability, such as memory or storage capability, current workload, location of execution, and/or environmental information, such as a temperature of the computing device. Next, at operation 1020, the PAE 100 may obtain one or more probabilities for actions and/or resources, such as from the PE 110. As discussed above, in various embodiments, these probabilities may be ordered for use by the PAE 100.

Next, at operation 1030, the PAE 100 may select actions and/or resource utilizations that support potential actions and/or resource allocations and which may be performed given the current system context for the computing device. Thus, in various embodiments, the PAE 100 may determine, for the potential action and/or resource utilizations for which probabilities were received, which support actions and/or resource utilizations may be performed, given the capabilities indicated by the system context. In various embodiments, the PAE 100, at operation 1030, may determine which of these support actions and/or resource utilizations may be performed without causing a noticeable slowdown to a user of the computing, device.

Finally, at operation 1040, the PAE 100 may facilitate performance of the selected actions and/or resources utilizations. In various embodiments, the PAE 100 may itself direct performance of the actions and/or resource utilizations. In other embodiments, the PAE 100 may request performance of the actions and/or resource utilizations from other entities. The process may then end.

Figure 11:
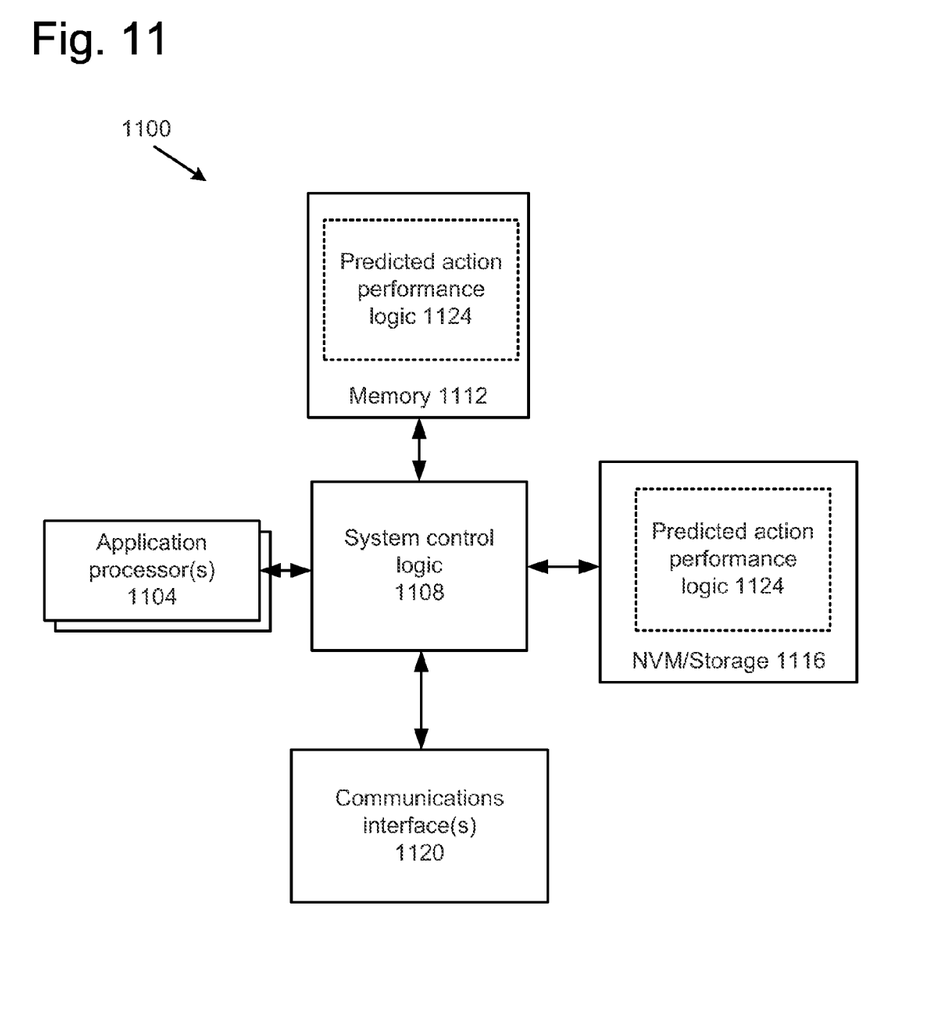
FIG. 11 illustrates an example computing environment suitable for practicing the disclosure, in accordance with various embodiments.

FIG. 11 illustrates, for one embodiment, an example computer system 1100 suitable for practicing embodiments of the present disclosure. As illustrated, example computer system 1100 may include control logic 1108 coupled to at least one of the processor(s) 1104, system memory 1112 coupled to system control logic 1108, non-volatile memory (NVM)/storage 1116 coupled to system control logic 1108, and one or more communications interface(s) 1120 coupled to system control logic 1108. In various embodiments, the one or more processors 1104 may be a processor core.

System control logic 1108 for one embodiment may include any suitable interface controllers to provide for any suitable interface to at least one of the processor(s) 1104 and/or to any suitable device or component in communication with system control logic 1108.

System control logic 1108 for one embodiment may include one or more memory controller(s) to provide an interface to system memory 1112. System memory 1112 may be used to load and store data and/or instructions, for example, for system 1100. In one embodiment, system memory 1112 may include any suitable volatile memory, such as suitable dynamic random access memory ("DRAM"), for example.

System control logic 1108, in one embodiment, may include one or more input/output ("I/O") controller(s) to provide an interface to NVM/storage 1116 and communications interface(s) 1120.

NVM/storage 1116 may be used to store data and/or instructions, for example. NVM/storage 1116 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 1116 may include a storage resource physically part of a device on which the system 1100 is installed or it may be accessible by, but not necessarily apart of, the device. For example, the NVM/storage 1116 may be accessed over a network via the communications interface(s) 1120.

System memory 1112 and NVM/storage 1116 may include, particular, temporal and persistent copies of predicted action performance logic 1124. The predicted action performance logic 1124 may include instructions that when executed by at least one of the processor(s) 1104 result in the system 1100 practicing one or more of the predicted action performance operations described above. In some embodiments, the predicted action performance logic 1124 may additionally/alternatively be located in the system control logic 1108.

Communications interface(s) 1120 may provide an interface for system 1100 to communicate over one or more network(s) and/or with any other suitable device. Communications interface(s) 1120 may include any suitable hardware and/or firmware, such as a network adapter, one or more antennas, a wireless interface, and so forth. In various embodiments, communication interface(s) 1120 may include an interface for system 1100 to use NFC, optical communications (e.g., barcodes), BlueTooth or other similar technologies to communicate directly (e.g., without an intermediary) with another device.

For one embodiment, at least one of the processor(s) 1104 may be packaged together with system control logic 1108 and/or predicted action performance logic 1124. For one embodiment, at least one of the processor(s) 1104 may be packaged together with system control logic 1108 and/or predicted action performance logic 1124 to form a System in Package ("SiP"). For one embodiment, at least one of the processor(s) 1104 may be integrated on the same die with system control logic 1108 and/or predicted action performance logic 1124. For one embodiment, at least one of the processor(s) 1104 may be integrated on the same die with system control logic 1108 and/or predicted action performance logic 1124 to form a System on Chip ("SoC").

The following paragraphs describe examples of various embodiments. In various embodiments, an apparatus for predicting activities of the apparatus may include one or more computer processors. The apparatus may also include a predicted action engine configured to be operated by the one or more computer processors to receive one or more indications of a current system context for a computing device. The predicted action engine may also be configured to be operated to select, based at least in part on the current context and one or more probabilities of potential actions or resource utilizations by first one or more processes executing on the computing device, one or more predicted actions or resource utilizations to be performed by second one or more processes to support the one or more actions or resource utilizations that are predicted for the first one or more tasks.

In various embodiments, the apparatus may further include at least a selected one of the first or second one or more processes. In various embodiments, the first and second one or more processes are the same one or more processes. In various embodiments, the apparatus may further include a probabilities engine further configured to be operated by the one or more computer processors to determine the one or more probabilities of potential actions or resource utilizations by first one or more processes executing on the computing device and to provide the determined one or more probabilities to the predicted action engine.

In various embodiments, the predicted action engine may be configured to receive one or more indications of a current system context via receipt of an execution state of a process. In various embodiments, the predicted action engine may be configured to receive one or more indications of a current system context via receipt of environmental information for the computing device.

In various embodiments, the predicted action engine may be configured to receive one or more indications of a current system context via receipt of an indication of availability of a resource. In various embodiments, the predicted action engine may be configured to select one or more predicted actions or resource utilizations through selection of one or more actions or resource utilizations that can be performed with the available resource without slowing down performance of the second computing device.

In various embodiments, the apparatus and the computing device may be the same device. In various embodiments, the predicted action engine configured to be operated by the one or more computer processors to facilitate performance of the one or more selected actions or resource utilizations. In various embodiments, the predicted action engine may be configured to facilitate performance of the one or more selected actions through a load of executable code for the one or more actions that are predicted to occur. In various embodiments, the predicted action engine may be configured to facilitate performance of the one or more selected resource utilizations through cache of data from the resource. In various embodiments, the predicted action engine is configured to facilitate performance of the one or more selected resource utilizations through performance of a data access over a network.

In various embodiments, the predicted action engine may be further configured to be operated by the one or more computer processors to receive the one or more probabilities of potential actions or resource utilizations by the first one or more processes. In various embodiments, the predicted action engine may be configured to receive the one or more probabilities of potential actions or resource utilizations by the first one or more processes through receipt of a structure comprising an ordered identification of potential actions or resource utilizations. In various embodiments, the predicted action engine may be configured to receive the structure comprising an ordered identification of potential actions or resource utilizations through receipt of a structure ordered by probability. In various embodiments, the predicted action engine may be configured to receive the structure comprising an ordered identification of potential actions or resource utilizations through receipt of a structure ordered by distance in time from a current event. In various embodiments, the predicted action engine may be further configured to be operated to add the selected action to the context.

Computer-readable media (including non-transitory computer-readable media), methods, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal, indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable media comprising instructions stored thereon that cause a first computing device, in response to execution of the instructions by the first computing device, to:

receive one or more indications of a current system context for a second computing device;

receive one or more probabilities of potential actions or resource utilizations of the second computing device, wherein to receive the one or more probabilities of potential actions or resource utilizations of the second computing device, the first computing device, in response to execution of the instructions, is to receive a flow structure comprising an ordered identification of potential actions or resource utilizations wherein the flow structure is ordered by probability and ordered by distance in time from a current event; and select, based at least in part on the current system context and the one or more probabilities of potential actions or resource utilizations of the second computing device, one or more actions or resource utilizations to be performed to assist performance of one or more actions or resource utilizations that are predicted to occur, wherein the one or more probabilities includes a probability indicating that an action or resource utilization of the one or more actions or resource utilizations is predicted to occur more than once per occurrence of the current system context.

2. The one or more computer-readable media of claim 1, wherein to receive the one or more indications of the current system context, the first computing device, in response to execution of the instructions, is to receive one or more of: an execution state of a process, environmental information for the second computing device, or an indication of availability of a resource.

3. The one or more computer-readable media of claim 1, wherein to select the one or more predicted actions or resource utilizations, the first computing device, in response to execution of the instructions, is to select one or more actions or resource utilizations that can be performed with available resources on the second computing device without slowing down performance of the second computing device.

4. The one or more computer-readable media of claim 1, wherein the first and second computing devices are the same computing device, and the instructions are to further cause the computing device, in response to execution of the instructions by the computing device, to facilitate performance of the one or more selected actions or resource utilizations.

5. The one or more computer-readable media of claim 4, wherein to facilitate performance of the one or more selected actions, the first computing device, in response to execution of the instructions, is to: load executable code for the one or more actions that are predicted to occur, cache data from the resource, or perform a data access over a network.

6. The one or more computer-readable media of claim 1, wherein the first computing device, in response to execution of the instructions, is to add the selected action to the context.

7. The one or more non-transitory computer-readable media of claim 1, wherein the one or more indications of a current system context includes an indication that a specific action has taken place, and wherein the probability indicating that the action or resource utilization is predicted to occur more than once per occurrence of the current system context includes a probability indicating that the action or resource utilization is predicted to occur more than once per occurrence of the specific action.

8. An apparatus for predicting activities of the apparatus, the apparatus comprising:
one or more computer processors;
a probabilities engine to be operated by the one or more computer processors to:
generate a flow structure to indicate a frequency of how often a transition between at least two steady states is observed during an observation period; and
determine one or more probabilities of potential actions or resource utilizations by first one or more processes executing on the computing device based on the generated flow structure, wherein the one or more probabilities of potential actions or resource utilizations are based on the frequency of how often the transition between the at least two steady states is observed as indicated by the flow structure; and a predicted action engine to be operated by the one or more computer processors to:
receive one or more indications of a current system context for a computing device; and
select, based at least in part on the current context and the one or more probabilities of potential actions or resource utilizations by first one or more processes executing on the computing device, one or more predicted actions or resource utilizations to be performed by second one or more processes to assist performance of the one or more actions or resource utilizations that are predicted for first one or more tasks, wherein the one or more probabilities includes a probability indicating that an action or resource utilization of the one or more actions or resource utilizations is predicted to occur more than once per occurrence of the current system context.

9. The apparatus of claim 8, further comprising at least a selected one of the first or second one or more processes.

10. The apparatus of claim 9, wherein the first and second one or more processes are the same one or more processes.

11. The apparatus of claim 8, wherein the probabilities engine comprises an analysis engine to be operated by the one or more computer processors to:
determine the one or more probabilities of potential actions or resource utilizations by first one or more processes executing on the computing device; and
provide the determined one or more probabilities to the predicted action engine.

12. The apparatus of claim 8, wherein the predicted action engine is to receive one or more indications of a current system context via receipt of an execution state of a process, environmental information for the computing device, or an indication of availability of a resource.

13. The apparatus of claim 8, wherein the predicted action engine is to select one or more predicted actions or resource utilizations through selection of one or more actions or resource utilizations that can be performed with available resources without slowing down performance of the second computing device.

14. The apparatus of claim 8, wherein:
the apparatus and the computing device are the same device; and
the predicted action engine is to be operated by the one or more computer processors to facilitate performance of the one or more selected actions or resource utilizations.

15. The apparatus of claim 14, wherein the predicted action engine is to facilitate performance of the one or more selected actions through one or more of: a load of executable code for the one or more actions that are predicted to occur, a cache of data from the resource, or performance of a data access over a network.

16. The apparatus of claim 8, wherein the predicted action engine is further to be operated by the one or more computer processors to receive the one or more probabilities of potential actions or resource utilizations by the first one or more processes.

17. The apparatus of claim 16, wherein the predicted action engine is to receive the one or more probabilities of potential actions or resource utilizations by the first one or more processes through receipt of the flow structure wherein the flow structure further comprises an ordered identification of potential actions or resource utilizations.

18. The apparatus of claim 17, wherein the predicted action engine is to receive the structure comprising the ordered identification of potential actions or resource utilizations through receipt of a structure ordered by probability and/or distance in time from a current event.

19. The apparatus of claim 8, wherein the predicted action engine is further to be operated to add the selected action to the context.

20. The apparatus of claim 8, wherein the one or more indications of a current system context includes an indication that a specific action has taken place, and wherein the probability indicating that the action or resource utilization is predicted to occur more than once per occurrence of the current system context includes a probability indicating that the action or resource utilization is predicted to occur more than once per occurrence of the specific action.

21. A computer-implemented method for improving responsiveness of a first computing device, the method comprising:
  receiving, by a second computing device, one or more indications of a current system context for the first computing device;
  receiving, by the second computing device, one or more probabilities of potential actions or resource utilizations of the first computing device wherein receiving the one or more probabilities of potential actions or resource utilizations of the first computing device comprises receiving a flow structure comprising an ordered identification of potential actions or resource utilizations, wherein the flow structure is ordered by probability and by distance in time from a current event; and
  selecting, by the second computing device, based at least in part on the current system context and one or more probabilities of potential actions or resource utilizations of the computing device, one or more actions or resource utilizations to be performed to assist performance of one or more actions or resource utilizations that are predicted to occur, wherein the one or more probabilities includes a probability indicating that an action or resource utilization of the one or more actions or resource utilizations is predicted to occur more than once per occurrence of the current system context.

22. The method of claim 21, wherein receiving one or more indications of a current system context comprises receiving one or more of: an execution state of a process, environmental information for the first computing device, or an indication of availability of a resource.

23. The method of claim 21, wherein selecting one or more predicted actions or resource utilizations comprises selecting one or more actions or resource utilizations that can be performed with available resources without slowing down performance of the first computing device.

24. The method of claim 21, wherein the first and second computing devices are the same computing device, and the method further comprises facilitating performance, by the computing device, of the one or more selected actions or resource utilizations.

25. The method of claim 24, wherein facilitating performance of the one or more selected actions comprises loading executable code for the one or more actions that are predicted to occur.

26. The method of claim 24, wherein facilitating performance of the one or more selected resource utilizations comprises one or more of caching data from the resource or performing a data access over a network.

27. The method of claim 21, wherein the one or more indications of a current system context includes an indication that a specific action has taken place, and wherein the probability indicating that the action or resource utilization is predicted to occur more than once per occurrence of the current system context includes a probability indicating that the action or resource utilization is predicted to occur more than once per occurrence of the specific action.

* * * * *